(12) United States Patent
Walker et al.

(10) Patent No.: US 10,914,272 B2
(45) Date of Patent: Feb. 9, 2021

(54) CATALYTIC REACTIVE COMPONENT REDUCTION SYSTEM AND METHODS FOR THE USE THEREOF

(71) Applicant: Phyre Technologies, Inc., El Cajon, CA (US)

(72) Inventors: Stephen Walker, San Diego, CA (US); Santosh Limaye, El Cajon, CA (US); Wesley Jung, Bonita, CA (US); Stuart Robertson, El Cajon, CA (US)

(73) Assignee: Phyre Technologies, Inc., El Cajon, CA (US)

(*) Notice: Subject to any disclaimer, the term of this patent is extended or adjusted under 35 U.S.C. 154(b) by 399 days.

(21) Appl. No.: 15/596,779

(22) Filed: May 16, 2017

(65) Prior Publication Data

US 2017/0328312 A1 Nov. 16, 2017

Related U.S. Application Data

(60) Provisional application No. 62/337,043, filed on May 16, 2017.

(51) Int. Cl.
| | |
|---|---|
| *F02M 25/08* | (2006.01) |
| *B01D 53/00* | (2006.01) |
| *F02M 31/20* | (2006.01) |
| *B01D 53/86* | (2006.01) |

(52) U.S. Cl.
CPC ......... *F02M 25/089* (2013.01); *B01D 53/002* (2013.01); *B01D 53/8668* (2013.01); *B01D 53/8671* (2013.01); *F02M 31/20* (2013.01); *B01D 2257/70* (2013.01); *B01D 2257/80* (2013.01); *B01D 2259/4516* (2013.01); *Y02T 10/12* (2013.01)

(58) Field of Classification Search
None
See application file for complete search history.

(56) References Cited

U.S. PATENT DOCUMENTS

| | | | |
|---|---|---|---|
| 4,761,162 A | 8/1988 | Ratcliffe et al. | |
| 5,682,757 A * | 11/1997 | Peterson | F24F 13/22 62/259.2 |
| 5,897,690 A | 4/1999 | McGrew | |

(Continued)

OTHER PUBLICATIONS

International Preliminary Report on Patentability issued in PCT Application No. PCT/US2017/032899, dated Nov. 29, 2018 in 7 pages.

(Continued)

*Primary Examiner* — Anita Nassiri-Motlagh
(74) *Attorney, Agent, or Firm* — Kilpatrick Townsend & Stockton LLP

(57) ABSTRACT

In accordance with the present invention, there are provided simplified systems and methods for catalytically deactivating, removing, or reducing the levels of reactive component(s) from the vapor phase of fuel storage tanks. The simple apparatus described herein can be utilized to replace complex OBIGGS systems on the market. Simply stated, in one embodiment of the invention, the vapor phase from the fuel tank is passed over a catalytic bed operated at appropriate temperatures to allow the reaction between free oxygen and the fuel vapor by oxidation of the fuel vapor, thus deactivating reactive component(s) in the gas phase.

10 Claims, 2 Drawing Sheets

(56) References Cited

U.S. PATENT DOCUMENTS

2009/0227034 A1    9/2009   Limaye et al.
2012/0219872 A1    8/2012   Tanaka et al.
2016/0053184 A1    2/2016   Wheeler et al.

OTHER PUBLICATIONS

PCT/US2017/032899, "International Search Report and Written Opinion", dated Aug. 25, 2017, 9 pages.

\* cited by examiner

CATALYTIC REACTIVE COMPONENT REDUCTION SYSTEM AND METHODS FOR THE USE THEREOF

CROSS-REFERENCE TO RELATED APPLICATIONS

This application claims the benefit of U.S. Provisional Application No. 62/337,043, filed May 16, 2016, which is hereby incorporated by reference in its entirety and for all purposes.

FIELD OF THE INVENTION

The present invention relates to the field of on board reactive component removal systems, and reaction systems and methods for the removal of reactive components from the vapor phase of fuel storage vessels. In a particular aspect, the invention relates to systems and methods for the catalytic removal of reactive components from the vapor phase of fuel storage vessels, specifically oxygen and/or fuel, thereby reducing the potential for fire and explosion in such vessels.

BACKGROUND OF THE INVENTION

In order to avoid the potential fire and explosion hazard in fuel tanks (e.g., aircraft fuel tanks, ships carrying flammable fluids as either fuel and/or cargo, land based storage tanks, trains, trucks, and the like), it is necessary to reduce the concentration of reactive components (e.g., oxygen and/or fuel vapors) in the gas phase that is in contact with liquid fuel. Many different approaches have been taken in efforts to address this problem. One such approach, for example, involves taking the bleed air from an aircraft engine, passing it through a membrane based gas separator to remove a sufficient amount of the oxygen so as to reduce the oxygen concentration below 10%. This reduced oxygen content gas is then used as an inert gas blanket in the fuel tank.

Another method employed in the art involves use of a pressure swing adsorption system to separate the oxygen from air to generate oxygen depleted inert gas.

These, as well as other systems described in the prior art require elaborate setup and add significantly to the cost of operation based on the provision of an on board inert gas generator system (OBIGGS). Accordingly, there is a need for improved systems and methods for removing reactive components (e.g., oxygen and/or fuel vapors), or reducing the levels thereof, from the vapor phase of fuel storage vessels.

SUMMARY OF THE INVENTION

In accordance with the present invention, there are provided simplified systems and methods for catalytically reducing the concentration of one or more reactive component(s) in the vapor phase of fuel storage tanks. The simple apparatus described herein can be utilized to replace complex OBIGGS systems on the market. Simply stated, in one embodiment of the invention, the vapor phase from the fuel tank is passed over a catalytic bed operated at appropriate temperatures to allow the reaction between free oxygen and the fuel vapor by oxidation of the fuel vapor, thus deactivating reactive components in the gas phase. In addition, circulation and treatment of vapors as contemplated herein minimizes the venting of fuel-containing vapors to the atmosphere.

In another embodiment of the present invention, there are provided systems for deactivating, reducing the concentration of, or removing one or more reactive components (e.g., oxygen and/or fuel vapors) from the vapor phase of a fuel storage tank. Invention systems include a reaction zone having an inlet and outlet, wherein the reaction zone provides conditions suitable to deactivate the reactive components. Optionally, inventive systems include the ability to remove heat and/or water from the vapor phase.

In yet another embodiment of the present invention, there are provided fuel storage systems for use in a vessel (e.g., an aircraft, a ship carrying flammable fluids as cargo, and the like), such fuel storage systems being capable of maintaining the concentration levels of one or more reactive components in the vapor phase of the fuel storage tank at sufficiently low levels so as to dramatically reduce the risk of fire and explosion therefrom. Moreover, circulation and treatment of vapors as contemplated herein minimizes the venting of fuel-containing vapors to the atmosphere.

In still another embodiment of the present invention, there are provided methods for deactivating, reducing the concentration of, or removing one or more reactive components from the vapor phase of a fuel storage tank. Invention methods comprise passing at least a portion of the vapor phase from the fuel storage tank through a reaction zone which serves to deactivate the reactive components before the vapor phase is returned to the fuel storage tank. Optionally, inventive methods include the ability to remove heat and/or water from the vapor phase.

DETAILED DESCRIPTION OF THE PREFERRED EMBODIMENTS

Figure 1:
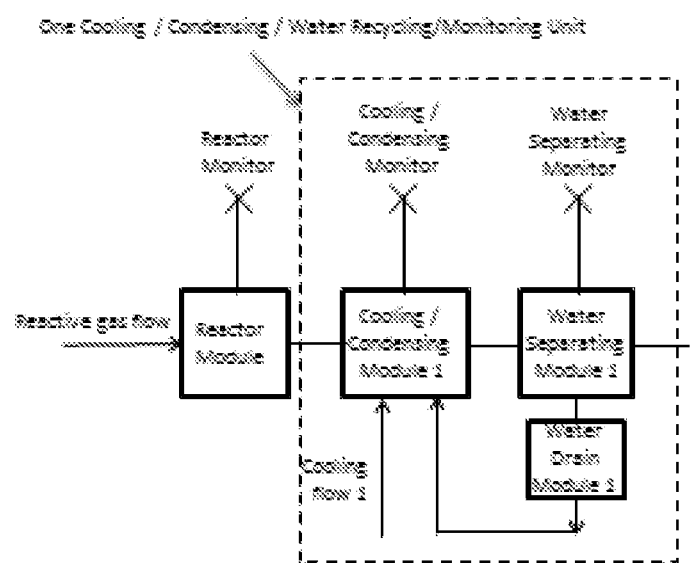
FIG. 1 is a schematic illustration of one embodiment of a reactive component reduction system according to the invention.
Figure 2:
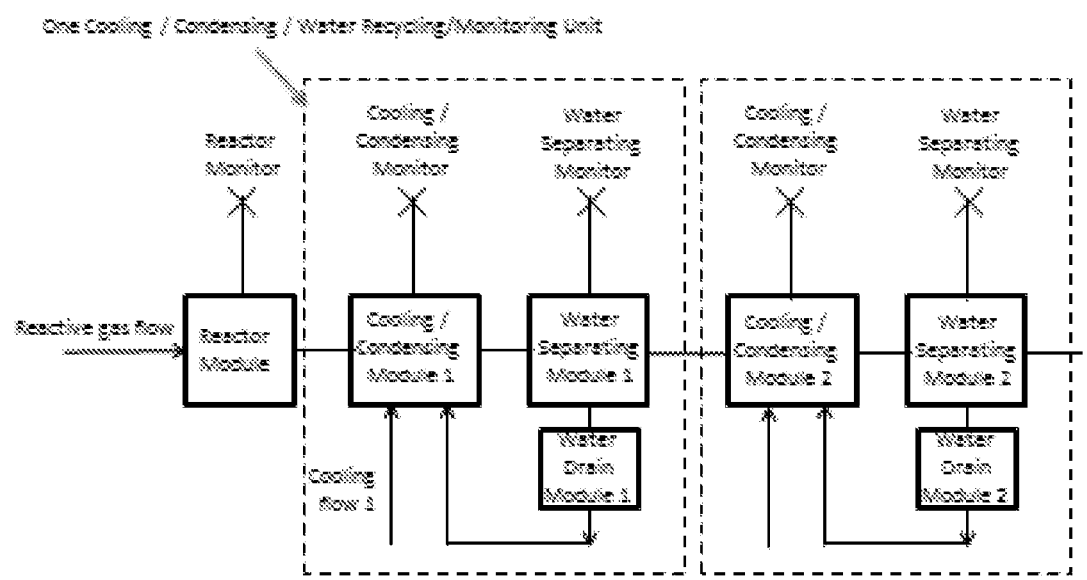
FIG. 2 is a schematic illustration of another embodiment of a reactive component reduction system according to the invention.

In accordance with the present invention, there are provided systems for reducing the concentration of one or more reactive component(s) in a vapor phase fluid prior to contacting thereof with fuel, wherein said system reduces the concentration of reactive component(s) in said vapor phase fluid below the concentration at which auto-ignition may occur when said vapor phase fluid is contacted with fuel. See, for example, FIGS. 1 and 2. Invention systems comprise:
a fuel container,
a fluid treating zone comprising:
  at least one inlet,
  at least one outlet, and
  a reaction zone, wherein said reaction zone provides conditions suitable to deactivate said one or more reactive component(s) when contacted therewith,
a first cooling/condensing module in fluid communication with the outlet of said fluid treating zone, and optionally
one or more additional cooling/condensing modules in fluid communication with the outlet of said first or subsequent cooling/condensing modules,
wherein:
  the inlet of said fluid treating zone is optionally in fluid communication with the fuel, the outlet of said fluid treating zone is in fluid communication with the fuel, and the condensate from any one of the cooling/condensing modules is returned to the same or a different cooling/condensing module or to the fluid treating zone as coolant therefor.

As readily recognized by those of skill in the art, there are a variety of reactive components which one may desirably wish to remove (or reduce the concentration of) when in contact with fuel (such as jet fuel). One reactive component contemplated for treatment in accordance with the present invention is oxygen. Another reactive component contemplated for treatment in accordance with the present invention may also include fuel vapor, as well as a variety of additives and/or impurities commonly associated therewith. A particular advantage of the present invention relates to the fact that circulation and treatment of vapors as contemplated herein minimizes the venting of fuel-containing vapors to the atmosphere, thereby reducing the environmental impact caused by the handling of such materials.

Invention systems optionally comprise an inlet/outlet which enables equilibration of pressure within the vessel depending on whether the vessel is exposed to sub- or super-atmospheric conditions. For example, it may be desirable to provide a source of make-up gas to equilibrate pressure within the system upon exposure to sub-atmospheric conditions. Alternatively, upon exposure to super-atmospheric conditions, it may be desirable to allow venting of the vessel to reduce the pressure therein. For example, upon ascent or descent of an aircraft, pressures within the aircraft, including fuel storage vessels therein, may vary significantly. In the case of descent, for example, it may be desirable to supplement the gas content of the vessel. Conversely, upon ascent of an aircraft, it may be desirable to relieve excess pressure on the fuel storage vessel. Optionally, make-up gas (or vented vapors) will be subjected to the invention method for deactivating one or more reactive component(s) therein (e.g., by reducing the concentration thereof) so as to reduce the safety hazards associated with the introduction of outside air into the system, or the venting of vapors to the atmosphere.

Invention systems may optionally be configured as closed loop systems. As employed herein, the term "closed loop" refers to the fact that the vapor having been treated to deactivate the reactive components therein is returned to the fuel storage vessel, rather than being vented. It is to be understood, however, that invention closed loop systems still contemplate the presence of one or more inlets/outlets for such purposes as equilibration of pressure therein, removal of water vapor or other components therefrom, and the like. The reaction zone contemplated for use in the practice of the present invention can be configured in a variety of ways, e.g., the reaction zone may comprise a vessel containing catalyst, wherein said catalyst is reactive with said one or more reactive component(s) when contacted therewith under suitable conditions. In some embodiments, the vessel has an inlet end and an outlet end, and catalyst content can vary throughout the vessel. In certain other embodiments the catalyst content can increase from the inlet end to the outlet end of the vessel.

As employed herein, "deactivate" refers to the conversion of reactive components such as oxygen, fuel vapor, and the like, into substantially non-reactive species, i.e., species that are substantially inert under the conditions to which they are exposed. Preferably, deactivated species are non-flammable.

Catalysts contemplated for use in the practice of the present invention include optionally supported metal catalysts, such as, for example, noble metals (e.g., platinum, palladium, gold, silver, and the like), precious metals, transition metals, metal oxides, rare earth oxides, nitrides, carbides, enzymes, and the like, as well as mixtures of any two or more thereof "Catalytic" refers to facilitating a reaction or interaction involving one or more reactants. Catalytic materials may include noble metals, transition metals, metal oxides (e.g., transition metal oxides such as RuOx, LaMnOx and perayskites), and the like, as well as various combinations thereof.

Catalytic materials contemplated for use herein may optionally be supported on a variety of materials, such as for example, metallic supports, activated carbon, carbon black, and the like, as well as mixtures thereof. Inorganic oxides may also be employed as support materials, either alone or in combination, e.g., silica, alumina, silica-alumina, magnesia, titania, zirconia, montmorillonite, and the like, or combinations thereof, for example, silica-chromium, silica-titania, and the like.

When catalytic treatment of reactive components is employed, a wide variety of suitable conditions for contacting said catalyst with said one or more reactive component(s) are contemplated. Exemplary conditions comprise contacting the vapor phase materials with catalyst at a temperature in the range of about 25° C. up to about 1200° C. Presently preferred temperatures contemplated for use herein range from about 50° C. up to about 400° C. Even more preferred are temperatures ranging from about 100° C. up to about 350° C.

To facilitate control of the above-described catalytic process, invention systems can optionally further comprise one or more sensors before, within, and/or after the fluid treating zone. In certain embodiments, said one or more sensors monitor one or more process parameter (e.g., the flow rate of the vapor phase, the level of reactive component(s) in said vapor phase, the temperature of the reaction zone, the temperature of one or more of said cooling/condensing modules, the pressure of said fluid, the water vapor content of the vapor phase, and the like.

In certain embodiments, the operation of the invention system is adjusted based on the input obtained from said one or more sensors. As readily recognized by those of skill in the art, the following exemplary parameters may be measured, and process steps that may be adjusted in response thereto include:

| Measured | Controlled |
| --- | --- |
| Flow rate of vapor phase | Pump controlling vapor phase flow |
| Temperature of reactor | Pump controlling vapor phase flow |
| Pressure of reactor | Pump controlling vapor phase flow |
| Level of reactants in vapor phase | Pump controlling vapor phase flow |
| Temperature of one or more cooling units | Pump controlling vapor phase flow |
| Pressure of one or more cooling units | Pump controlling vapor phase flow |
| Temperature of first cooling unit | Pump cooling first cooling/condensing unit |
| Pressure of first cooling unit | Pump cooling first cooling/condensing unit |
| Temperature of downstream units (i.e., components other than the first cooling unit) | Pump cooling first cooling/condensing unit |
| Temperature of second and subsequent cooling unit(s) | Pump cooling second and subsequent cooling/condensing unit(s) |

-continued

| Measured | Controlled |
|---|---|
| Pressure of second and subsequent cooling unit(s) | Pump cooling second and subsequent cooling/condensing unit(s) |
| Temperature of downstream units (i.e., components other than the second and subsequent cooling units) | Pump cooling second and subsequent cooling/condensing unit(s) |

A key to control is the recognition that the "flow rate of the vapor phase" is governed (in varying degree) by virtually every measured parameter of every component. Controlling the flow of vapor (for example, by adjusting the vapor phase pump) is an exemplary way in which the overall rate of reaction is controlled herein, and allows one to shut or slow down the system if any component goes outside of the desired performance parameters.

In addition, the flow of cooling to each cooling unit downstream of the reactor is controlled by all properties within that unit, as well as potentially parameters from other units downstream.

Optionally, invention systems may further comprise a flame arrestor between the fuel storage tank and the reaction zone so as to prevent any possibility of combustion to communicate back to the fuel storage tank. Alternatively, the reaction zone can be designed so as to prevent any flame formation.

Additional optional features which may be included in invention systems include one or more oxygen sensors, which may be positioned upstream and/or downstream from the reaction zone so as to monitor the oxygen levels in the inlet and/or outlet gas of the fuel storage tank. Additionally, a feedback loop could be provided so as to adjust the contacting conditions within the reaction zone as a function of the oxygen levels detected before and/or after the reaction zone.

As used herein, the term "upstream" refers to an element in a flow scheme which is located prior to or before a reference point or reference element. As used herein, the term "downstream" refers to an element in a flow scheme which is located after a reference point or reference element.

In certain embodiments of the invention, the system may also include a fluid purification module adapted to remove water from the treated air. For example, the fluid purification module may include a condenser to reduce the temperature of the treated vapor below the dew point, thereby facilitating removal of any excess water. In a particular embodiment, the fluid purification module may include a pressure swing adsorption module. In other embodiments, the purification module may include membranes. A recirculation line may be provided to transfer the fluid from the fluid purification module to the inlet to the reaction zone. The fluid purification module may be located upstream or downstream from the reaction zone. In other embodiments, water may be removed by a moisture trap.

As used herein, "purification" and "purifying" refer to the removal from a fluid of one or more components. The removal may be partial, complete or to a desired level and may include removal of only some or all components.

In one embodiment, the system may also include a recirculation line adapted to transfer the fluid from the separator to the inlet of the reaction zone.

In one embodiment, the system may also include a liquid trap adapted to separate condensed liquid mixed with vapors.

In accordance with a further aspect of the present invention, there are provided systems for reducing the concentration of one or more reactive component(s) in a vapor phase fluid prior to contacting thereof with fuel, wherein said system reduces the concentration of reactive component(s) in said vapor phase fluid below the concentration at which auto-ignition may occur when said vapor phase fluid is contacted with fuel. See, for example, FIGS. 1 and 2. Invention systems comprise:
  a fuel container,
  a fluid treating zone comprising:
    at least one inlet,
    at least one outlet, and
    a reaction zone, wherein said reaction zone provides conditions suitable to deactivate said one or more reactive component(s) when contacted therewith, and
  one or more sensors before, within, and/or after the fluid treating zone,
wherein:
  the inlet of said fluid treating zone is optionally in fluid communication with the fuel,
  the outlet of said fluid treating zone is in fluid communication with the fuel, and
  the operation of said system is adjusted based on the input obtained from said one or more sensors.

In accordance with a still further aspect of the present invention, there are provided fuel storage systems. See, for example, FIGS. 1 and 2. Invention systems comprise:
  a container having an outlet for removal of vapor therefrom, and an inlet for return of vapor thereto,
  a reaction zone which provides conditions suitable to deactivate one or more reactive component(s) in the vapor phase of said container when contacted therewith,
  an external source of fuel vapor,
  a first cooling/condensing module in fluid communication with the outlet of said fluid treating zone, and optionally,
  one or more additional cooling/condensing modules in fluid communication with the outlet of said first or subsequent cooling/condensing modules,
wherein:
  said container and the reaction zone are in fluid communication with one another, and
  the condensate from any one of the cooling/condensing modules is returned to the same or a different cooling/condensing module as coolant therefor.

In accordance with yet another aspect of the present invention, there are provided fuel storage systems for use in aircraft. See, for example, FIGS. 1 and 2. Invention fuel storage systems comprise:
  a container having an outlet for removal of vapor therefrom, and an inlet for return of vapor thereto,
  a reaction zone which provides conditions suitable to deactivate one or more reactive component(s) in the vapor phase of said container when contacted therewith,
  an external source of fuel vapor, and
  one or more sensors before, within, and/or after the fluid treating zone,
wherein:
  said container and the reaction zone are in fluid communication with one another, and
  the operation of said system is adjusted based on the input obtained from said one or more sensors.

In accordance with still another aspect of the present invention, there are provided systems for (a) introducing reactive component-depleted air into a container having fuel therein as fuel is withdrawn therefrom, or (b) displacing fuel in, or vapor in the vapor space of, a container having fuel therein with reactive component-depleted air. See, for example, FIGS. 1 and 2. Invention systems comprise:
 a fuel container,
 a fluid treating zone comprising:
  at least one inlet,
  at least one outlet, and
  a reaction zone, wherein said reaction zone provides conditions suitable to deactivate said one or more reactive component(s) when contacted therewith,
 a first cooling/condensing module in fluid communication with the outlet of said fluid treating zone, and optionally
 one or more additional cooling/condensing modules in fluid communication with the outlet of said first or subsequent cooling/condensing modules,
wherein:
 the inlet of said fluid treating zone is optionally in fluid communication with the fuel,
 the outlet of said fluid treating zone is in fluid communication with the fuel, and
 the condensate from any one of the cooling/condensing modules is returned to the same or a different cooling/condensing module as coolant therefor.

Embodiments of the invention can include a temperature modulator associated with the catalyst zone. In other embodiments, invention systems can include a trap for removing water from the vapor.

In accordance with still another aspect of the present invention, there are provided systems for (a) introducing reactive component-depleted air into a container having fuel therein as fuel is withdrawn therefrom, or (b) displacing fuel in, or vapor in the vapor space of, a container having fuel therein with reactive component-depleted air. See, for example, FIGS. 1 and 2. Invention systems comprise:
 a fuel container,
 a fluid treating zone comprising:
  at least one inlet,
  at least one outlet, and
  a reaction zone, wherein said reaction zone provides conditions suitable to deactivate said one or more reactive component(s) when contacted therewith, and
 one or more sensors before, within, and/or after the fluid treating zone,
wherein:
 the inlet of said fluid treating zone is optionally in fluid communication with the fuel,
 the outlet of said fluid treating zone is in fluid communication with the fuel, and
 the operation of said system is adjusted based on the input obtained from said one or more sensors.

In accordance with still another aspect of the present invention, there are provided systems for reducing the concentration of one or more reactive component(s) in a vapor phase fluid prior to contacting thereof with fuel, wherein said system reduces the concentration of reactive component(s) in said vapor phase fluid below the concentration at which auto-ignition may occur when said vapor phase fluid is contacted with fuel. See, for example, FIGS. 1 and 2. Invention systems comprise:
 a fuel container,
 a fluid treating zone comprising:
  at least one inlet,
  at least one outlet, and
  a reaction zone, wherein said reaction zone provides conditions suitable to deactivate said one or more reactive component(s) when contacted therewith,
 a first cooling/condensing module in fluid communication with the outlet of said fluid treating zone, and optionally
 one or more additional cooling/condensing modules in fluid communication with the outlet of said first or subsequent cooling/condensing modules,
wherein:
 the inlet of said fluid treating zone is optionally in fluid communication with the fuel,
 the outlet of said fluid treating zone is in fluid communication with the fuel, and
 the condensate from any one of the cooling/condensing modules is returned to the same or a different cooling/condensing module as coolant therefor.

In accordance with yet another aspect of the present invention, there are provided systems for reducing the concentration of one or more reactive component(s) in a vapor phase fluid prior to contacting thereof with fuel, wherein said system reduces the concentration of reactive component(s) in said vapor phase fluid below the concentration at which auto-ignition may occur when said vapor phase fluid is contacted with fuel. See, for example, FIGS. 1 and 2. Invention systems comprise:
 a fuel container,
 a fluid treating zone comprising:
  at least one inlet,
  at least one outlet, and
  a reaction zone, wherein said reaction zone provides conditions suitable to deactivate said one or more reactive component(s) when contacted therewith, and
 one or more sensors before, within, and/or after the fluid treating zone,
wherein:
 the inlet of said fluid treating zone is optionally in fluid communication with the fuel,
 the outlet of said fluid treating zone is in fluid communication with the fuel, and
 the operation of said system is adjusted based on the input obtained from said one or more sensors.

In accordance with still another aspect of the present invention, there are provided methods for displacing fuel in, or vapor in the vapor space of, a container having fuel therein with reactive component-depleted air as fuel is withdrawn from the container, said method comprising:
 combining air with vaporized fuel in any system according to the present invention,
 passing the resulting combination through a fluid treating zone under conditions suitable to produce reactive component-depleted air,
 removing any water from the reactive component-depleted air to produce substantially water-free, reactive component-depleted air,
 introducing the resulting substantially water-free, reactive component-depleted air into said container as fuel is withdrawn therefrom, and
 introducing the removed water into the cooling side of any one of the cooling/condensing modules or the fluid treating zone.

Additional methods contemplated herein for displacing fuel in, or vapors in the vapor space of, a fuel storage vessel with reactive component-depleted vapor (e.g., as fuel or fuel vapor from the vapor space thereof is withdrawn therefrom) comprise:

introducing ambient air, optionally in combination with a fuel material, into a fluid treating zone in a system according to any system according to the present invention under conditions suitable to produce reactive component-depleted air, removing any water from the reactive component-depleted air to produce substantially water-free, reactive component-depleted air, introducing the resulting substantially water-free, reactive component-depleted air into said container as fuel-containing vapor is withdrawn therefrom, and introducing the removed water into the cooling side of any one of the cooling/condensing modules.

Additional methods contemplated herein include methods for inserting the vapor space of a container employed for the storage of fuel therein. Invention methods comprise replacing the vapor in said container, prior to the introduction of fuel into said container, with reactive component-depleted air prepared by:

passing ambient air, optionally in combination with a fuel material, through a fluid treating zone in a system according to any system according to the present invention under conditions suitable to produce reactive component-depleted air, removing any water from the reactive component-depleted air to produce substantially water-free, reactive component-depleted air, and introducing the removed water into the cooling side of any one of the cooling/condensing modules.

While the exemplary embodiments illustrated in the Figures and described above are presently preferred, it should be understood that these embodiments are offered by way of example only. Other embodiments may include, for example, different techniques for performing the same operations. The invention is not limited to a particular embodiment, but extends to various modifications, combinations, and permutations that nevertheless fall within the scope and spirit of the appended claims.

That which is claimed is:

1. A system for reducing a concentration of one or more reactive component(s) in a vapor phase fluid prior to contacting thereof with fuel, wherein said system reduces the concentration of reactive component(s) in said vapor phase fluid below a concentration level at which auto-ignition may occur when said vapor phase fluid is contacted with fuel, said system comprising:
a fuel container,
a fluid treating zone comprising:
at least one inlet,
at least one outlet, and
a reaction zone, wherein said reaction zone provides conditions suitable to deactivate said one or more reactive component(s) when contacted therewith,
a first cooling/condensing module comprising an inlet to a cooling side of the first cooling/condensing module, the first cooling/condensing module in fluid communication with the outlet of said fluid treating zone,
a pump controlling cooling of the first cooling/condensing module; and optionally
one or more additional cooling/condensing modules in fluid communication with the outlet of said first or subsequent cooling/condensing modules, wherein:
the inlet of said fluid treating zone is optionally in fluid communication with the fuel,
the outlet of said fluid treating zone is in fluid communication with the fuel, and
the condensate from any one of the cooling/condensing modules is introduced via the inlet into the cooling side of the same or a different cooling/condensing module as coolant therefor.

2. The system of claim 1 further comprising one or more sensors before, within, and/or after the fluid treating zone.

3. The system of claim 2 wherein said one or more sensors monitor one or more of a flow rate of the vapor phase, a level of reactive component(s) in said vapor phase, a temperature of the reaction zone, a temperature of one or more of said cooling/condensing modules, a pressure of said fluid, and a water vapor content of the vapor phase.

4. The system of claim 3 wherein operation of said system is adjusted based on the input obtained from said one or more sensors.

5. A system for reducing a concentration of one or more reactive component(s) in a vapor phase fluid prior to contacting thereof with fuel, wherein said system reduces the concentration of reactive component(s) in said vapor phase fluid below a concentration level at which auto-ignition may occur when said vapor phase fluid is contacted with fuel, said system comprising:
a fuel container,
a fluid treating zone comprising:
at least one inlet,
at least one outlet, and
a reaction zone, wherein said reaction zone provides conditions suitable to deactivate said one or more reactive component(s) when contacted therewith,
a first cooling/condensing module comprising an inlet to a cooling side of the first cooling/condensing module, the first cooling/condensing module in fluid communication with the outlet of said fluid treating zone,
a pump controlling cooling of the first cooling/condensing module, and
one or more sensors before, within, and/or after the fluid treating zone, the one or more sensors configured to monitor a temperature of the first cooling/condensing module, wherein:
the inlet of said fluid treating zone is optionally in fluid communication with the fuel,
the outlet of said fluid treating zone is in fluid communication with the fuel,
the condensate from any one of the cooling/condensing modules is introduced via the inlet into the cooling side of the same or a different cooling/condensing module as coolant therefor, and
operation of said system is adjusted based on the input obtained from said one or more sensors.

6. A fuel storage system, said system comprising:
a container having an outlet for removal of vapor therefrom, and an inlet for return of vapor thereto,
a reaction zone which provides conditions suitable to deactivate one or more reactive component(s) in a vapor phase of said container when contacted therewith,
an external source of fuel vapor,
a first cooling/condensing module comprising an inlet to a cooling side of the first cooling/condensing module, the first cooling/condensing module in fluid communication with the outlet of said reaction zone, a pump controlling cooling of the first cooling/condensing module, and optionally,
one or more additional cooling/condensing modules in fluid communication with the outlet of said first or subsequent cooling/condensing modules, wherein:
said container and the reaction zone are in fluid communication with one another, and
the condensate from any one of the cooling/condensing modules is introduced via the inlet into the cooling side of the same or a different cooling/condensing module as coolant therefor.

7. A fuel storage system, said system comprising:
a container having an outlet for removal of vapor therefrom, and an inlet for return of vapor thereto,
a reaction zone which provides conditions suitable to deactivate one or more reactive component(s) in a vapor phase of said container when contacted therewith,
an external source of fuel vapor,
a first cooling/condensing module comprising an inlet to a cooling side of the first cooling/condensing module, the first cooling/condensing module in fluid communication with the outlet of said reaction zone,
a pump controlling cooling of the first cooling/condensing module, and
one or more sensors before, within, and/or after the reaction zone, the one or more sensors configured to monitor a temperature of the first cooling/condensing module, wherein:
said container and the reaction zone are in fluid communication with one another,
the condensate from any one of the cooling/condensing modules is introduced via the inlet into the cooling side of the same or a different cooling/condensing module as coolant therefor, and
operation of said system is adjusted based on the input obtained from said one or more sensors.

8. A system for (a) introducing reactive component-depleted air into a container having fuel therein as fuel is withdrawn therefrom, or (b) displacing fuel in, or vapor in a vapor space of, a container having fuel therein with reactive component-depleted air, said system comprising:
a fuel container,
a fluid treating zone comprising:
at least one inlet,
at least one outlet, and
a reaction zone, wherein said reaction zone provides conditions suitable to deactivate said one or more reactive component(s) when contacted therewith,
a first cooling/condensing module comprising an inlet to a cooling side of the first cooling/condensing module, the first cooling/condensing module in fluid communication with the outlet of said fluid treating zone,
a pump controlling cooling of the first cooling/condensing module, and optionally one or more additional cooling/condensing modules in fluid communication with the outlet of said first or subsequent cooling/condensing modules, wherein:
the inlet of said fluid treating zone is optionally in fluid communication with the fuel,
the outlet of said fluid treating zone is in fluid communication with the fuel, and
the condensate from any one of the cooling/condensing modules is introduced via the inlet into the cooling side of the same or a different cooling/condensing module as coolant therefor.

9. A system for (a) introducing reactive component-depleted air into a container having fuel therein as fuel is withdrawn therefrom, or (b) displacing fuel in, or vapor in a vapor space of, a container having fuel therein with reactive component-depleted air, said system comprising:
a fuel container,
a fluid treating zone comprising:
at least one inlet,
at least one outlet, and
a reaction zone, wherein said reaction zone provides conditions suitable to deactivate said one or more reactive component(s) when contacted therewith,
a first cooling/condensing module comprising an inlet to a cooling side of the first cooling/condensing module, the first cooling/condensing module in fluid communication with the outlet of said fluid treating zone,
a pump controlling cooling of the first cooling/condensing module, and
one or more sensors before, within, and/or after the fluid treating zone, the one or more sensors configured to monitor a temperature of the first cooling/condensing module, wherein:
the inlet of said fluid treating zone is optionally in fluid communication with the fuel,
the outlet of said fluid treating zone is in fluid communication with the fuel,
the condensate from any one of the cooling/condensing modules is introduced via the inlet into the cooling side of the same or a different cooling/condensing module as coolant therefor, and
operation of said system is adjusted based on the input obtained from said one or more sensors.

10. A system for reducing a concentration of one or more reactive component(s) in a vapor phase fluid prior to contacting thereof with fuel, wherein said system reduces the concentration of reactive component(s) in said vapor phase fluid below a concentration level at which auto-ignition may occur when said vapor phase fluid is contacted with fuel, said system comprising:
a fuel container,
a fluid treating zone comprising:
at least one inlet,
at least one outlet, and
a reaction zone, wherein said reaction zone provides conditions suitable to deactivate said one or more reactive component(s) when contacted therewith,
a first cooling/condensing module comprising an inlet to a cooling side of the first cooling/condensing module, the first cooling/condensing module in fluid communication with the outlet of said fluid treating zone,
a pump controlling cooling of the first cooling/condensing module, and
one or more sensors before, within, and/or after the fluid treating zone, the one or more sensors configured to monitor a temperature of the first cooling/condensing module, wherein:
the inlet of said fluid treating zone is optionally in fluid communication with the fuel,
the outlet of said fluid treating zone is in fluid communication with the fuel, the condensate from any one of the cooling/condensing modules is introduced via the inlet into the cooling side of the same or a different cooling/condensing module as coolant therefor, and operation of said system is adjusted based on the input obtained from said one or more sensors.

* * * * *